(12) United States Patent
Schuetz et al.

(10) Patent No.: US 6,725,451 B1
(45) Date of Patent: Apr. 20, 2004

(54) METHOD FOR CONVERTING A SYSTEM CALL

(75) Inventors: Wolfgang Schuetz, Unterhaching (DE); Manfred Stadel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,443

(22) PCT Filed: Nov. 26, 1998

(86) PCT No.: PCT/DE98/03484

§ 371 (c)(1),
(2), (4) Date: Jul. 26, 2000

(87) PCT Pub. No.: WO99/31584

PCT Pub. Date: Jun. 24, 1999

(30) Foreign Application Priority Data

Dec. 17, 1997 (DE) .......................................... 197 56 181

(51) Int. Cl.⁷ ................................................. G06F 9/45
(52) U.S. Cl. ........................................................ 717/151
(58) Field of Search ........................... 717/151; 709/319

(56) References Cited

U.S. PATENT DOCUMENTS

| | | |
|---|---|---|
| 5,313,614 A | 5/1994 | Goettelmann et al. |
| 5,339,422 A | 8/1994 | Brender et al. |
| 5,414,848 A | 5/1995 | Sandage et al. |
| 5,481,684 A | 1/1996 | Richter et al. |
| 5,600,790 A | 2/1997 | Barnstijn et al. |
| 5,935,242 A * | 8/1999 | Madany et al. ................. 713/1 |
| 5,987,512 A * | 11/1999 | Madany et al. ............. 709/221 |
| 6,182,158 B1 * | 1/2001 | Kougiouris et al. ........ 709/328 |
| 6,199,196 B1 * | 3/2001 | Madany et al. ............. 717/165 |
| 6,363,421 B2 * | 3/2002 | Barker et al. ............... 709/223 |
| 6,453,467 B2 * | 9/2002 | Madany et al. ............. 717/165 |
| 6,493,870 B1 * | 12/2002 | Madany et al. ............. 717/165 |

FOREIGN PATENT DOCUMENTS

| | | |
|---|---|---|
| EP | 0 737 919 A2 | 12/1996 |
| EP | 0 798 637 A1 | 1/1997 |

OTHER PUBLICATIONS

IBM Technical Disclosure Bulletin—vol 38 No 01 Jan. 1995—Algorithm to Support the Emulation of UNIX SIGALRM Signal in OS/2.*
Object–Oreinted Information Systems Planning and Implementation, David A. Taylor, pp. 296–299, published Apr. 10, 1992.*

* cited by examiner

Primary Examiner—Todd Ingberg
(74) Attorney, Agent, or Firm—Schiff Hardin LLP

(57) ABSTRACT

In a method for converting a system call for an origin operating system into a system call for a destination operating system, an emulation routine is called. The emulation routine converts a reference structure comprising a reference value and at least one referenced element by converting at least the reference value, and it performs the system call for the destination operating system This method makes it possible to run application programs on a destination system without specific adaptation or retranslation, and even when the original operating system has not been ported to the destination system.

12 Claims, 3 Drawing Sheets

METHOD FOR CONVERTING A SYSTEM CALL

BACKGROUND OF THE INVENTION

The invention relates to a method for converting a system call for an origin operating system into a system call for a destination operating system.

The invention can be employed in particular when an application program that has been created for an origin system (processor and operating system) is supposed to run on a different destination system. In particular, the invention is provided for cases when the origin and destination operating systems are in fact related, but are nevertheless somewhat different from one another. For example, the two operating systems can be a matter of different UNIX variants or of major ports of an operating system to different hardware. Thus, the following deviations of the hardware architecture can affect the interface between the application program and the operating system:

different address ranges and/or address space topologies (e.g. transition from a 32-bit system to a 64-bit system);

different sequence of bytes of binary numerical values in the memory (e.g. transition from a little endian system to a big endian system), and different coding of characters (e.g. transition from an ASCII system to an EBCDIC system).

It is a known procedure when transferring to a different processor architecture to port the original operating system to the destination processor as well. Expansions of the operating system that may be provided are then performed in such a way that the previous functionality is left unchanged (downward compatibility). Known methods such as emulation or static or dynamic object code transformation serve for the execution of the application programs. The system calls contained in the application programs need not be taken into account separately, since they are valid on the ported operating system.

However, it is expensive to port the operating system to the destination computer as required by this method. To obtain downward compatibility, it is often necessary to make technical compromises which degrade the performance capability of the new operating system.

U.S. Pat. No. 5,313,614 teaches to port both an application program and an original operating system to the new computer, which comprises an independent operating system on its part. In this case, the system calls of the application program can be maintained unchanged. However, due to the necessary porting, this method is relatively expensive.

SUMMARY OF THE INVENTION

Accordingly, it is an object of the invention to avoid the cited problems and to set forth a method for converting a system call which does not require porting of the original operating system and which nevertheless makes it possible to have an application program run on the destination system without any specific adjusting or retranslation. This is particularly significant when the application program is present only as object code.

This object is achieved by a method of the invention for converting a system call for an origin operating system into a system call for a destination operating system wherein an emulation routine is called. With the emulation routine, a reference structure is converted which comprises at least one referenced element by converting at least a reference value. With the emulation routine, the system call is performed for the destination operating system. The conversion of the reference structure can relate to a parameter for the system call as well as to a result value of the system call. The term "system call" here is intended to subsume the entire process that is associated with the call of an operating system service (including the return of the result value).

The invention is based on the fundamental idea of system calls (supervisor calls) of the application program to the origin operating system using specific emulation routines and converting them into calls to the destination operating system. What is essential for the invention is to lay out suitable methods for converting reference structures. In this context, reference structures are structures that not only contain the actual data, but also comprise a reference value with the aid of which it is possible to access referenced elements (data, functions, private areas of the operating system, ... ). In many cases, in procedure or system calls only the reference value is delivered, for instance a pointer or an index or a designator. The term "structure" as used here should be understood in the broadest sense as any arrangement of data and/or references and should not be limited to the data type of a "structure" in the programing language C.

The invention opens up the possibility of executing application programs on new and advanced systems. When the machine languages of the original and new systems agree (binary code compatibility), the application program can run on the destination system unchanged or with minimal modifications. Otherwise, a suitable conversion must be provided by known methods. For example, an emulator for the machine language of the application program can be provided, or techniques of static or dynamic object code transformation can be employed. The invention can be utilized in all these techniques to provide a conversion of system calls.

Besides being applied in the migration of application programs, the invention can also be employed when a client/server architecture is to be set up from client and server components that are not matched with one another. In this case, the method of the invention is executed by an adapter which is inserted between client and server or which surrounds the server in the sense of an intermediate layer (wrapping). Furthermore, the method of the invention can also be executed by adapters that have been generated automatically from an IDL interface description (IDL: Interface Definition Language). In general, the invention can be used when system calls with reference structures can arise. These can be a matter of calls of a (local) application program or of non-local calls (remote procedure call or remote system call).

In preferred embodiments of the invention, the emulation routines execute at least primarily conversion functions (as opposed to operating system functions). Preferably, the proportion of conversion functions is over 70% or over 90%, and the proportion of other functions is only small. The essential work is thus performed by the destination operating system. The emulation routines can then be kept relatively compact and are much less expensive to develop than the porting of an operating system would be.

In preferred embodiments, if necessary not only the reference value but also the at least one referenced element is at least partially converted. The referenced element can also be a matter of an element that cannot be interpreted further, however. For example, it can be an element of an abstract data type. In this case, a conversion table is preferably provided in order to assign reference values to one another in accordance with the conventions of the origin and destination operating systems. The conversion table can be implemented by arbitrary means which provide this assigning functionality.

In other preferred embodiments, the referenced element can be a function. The emulation routine then preferably replaces the original reference value with a new reference value that references an adapter function. The adapter function can be generic or can be specifically generated in the conversion dependent on the type or other characteristics of the origin function. A table can be used here as well.

In further embodiments, the referenced element is a system file and/or a tuple and/or a concatenated data structure and/or a date and/or a time indication and/or a context and/or an array and/or a character string. In these and other cases, the referenced element can have a significance that can be interpreted by the emulation routine. The conversion occurs in such a way that this significance is maintained to the greatest extent possible.

Exemplifying embodiments of the invention are detailed below with reference to the drawings.

DESCRIPTION OF THE PREFERRED EMBODIMENTS

Figure 1:
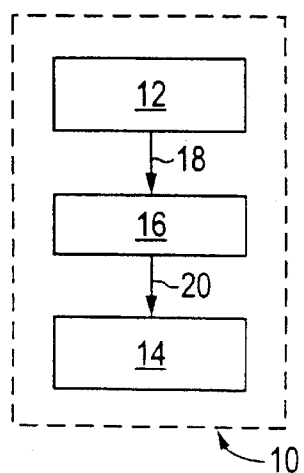
FIG. 1 is a schematic representation of the principal integration of the inventive conversion method into the program execution.

In the illustration in FIG. 1, a destination system 10 is executing an application program 12. The destination system 10 contains a destination operating system 14, which is capable of processing a plurality of system calls. The application program 12 is provided for an origin operating system that is somewhat different from the destination operating system 14. Accordingly, the system calls contained in the application program 12 are not fully compatible with the system services that are provided by the destination operating system 14. Even when the functions of the individual system calls approximately match, there is usually a difference in the type of parameter and result delivery and in the data types of the parameters and results (value ranges and coding of the values).

In order to be able to execute the application program 12 on the destination system 10 despite this fact, without having to transcribe the former, several emulation routines are provided, one of which is referenced 16 in FIG. 1. The emulation routines are inserted "between" the application program 12 and the destination operating system 14. When the application program 12 performs a system call that corresponds to the conventions of the origin operating system, this is converted into a call 18 of the emulation routine 16. On its part, the emulation routine 16 provides for the necessary conversions of the parameters and then executes at least one system call 20 that is directed to the destination operating system 14. Result values that may be returned by the destination operating system 14 are converted by the emulation routine 16 and forwarded to the application program 12 in turn. The details of the conversion of different types of data are described below.

In the example illustrated in FIG. 1, the sequence code (set of machine instructions) of the destination system 10 is binary-compatible with that of the origin system. The application program 12 can thus be executed by the destination system 10 directly. The emulation routines 16 are integrated into the call chain in that corresponding handlers for system calls are entered at the destination operating system 14.

In alternative embodiments in which the application program 12 is not runnable directly on the destination system 10, a suitable emulator or object code transformer is provided, which converts the binary code of the application program 12 statically or dynamically, thereby appropriately intercepting or transforming the system calls contained in the application program 12.

In the following description of the conversion of different data types by emulation routines 16, a data type that corresponds to the conventions of the origin operating system is designated as origin type, and the allocated data type of the destination operating system 14 is designated as destination type. For the sake of thoroughness, the handling of data types that are not reference types is also briefly described. In the ideal case, a one-to-one mapping of the values of the origin type into values of the destination type, and vice versa, should be found by the conversion.

1. Simple Types 1.1 Numeric Types

Here, the conventional conversion rules are used, such as are known from higher programing languages, for example. Beyond this, differences between the origin system and the destination system 10 with respect to the coding of numerical values are taken into account. For example, the two systems can differ with respect to the type of floating point representations or the number coding (decimal versus binary, big endian versus little endian).

If the value range of a data type is larger in one system than in the other, values outside the permitted range can arise in the conversion. Given such impermissible values, the emulation routines 16 trigger an exception.

1.2 Character Types

Character types are treated analogously to numerical types, with different character codings in the origin and destination systems being taken into account (see section 2.4).

1.3 List Types

List types (for instance UNIX type "idop_t") are generally converted like numerical types. However, this does not apply when the values of a list type have a significance relating to the operating system functions. For instance, list types are often used as function codes for determining a subfunction of a system call or as error codes for acknowledging an exception situation. In these cases, some embodiments of the invention treat an element of a list type as a reference structure that references a particular operating system function or a particular result. The conversion is then accomplished in such a way that the significance of the element of the list type is maintained to the greatest extent possible.

When the list type contains function codes, for instance, the emulation routine 16 executes that call of the destination operating system 14 which provides the desired functionality. Depending on the circumstances of the individual case, either another system call or another function code can be utilized for this. Accordingly, an error code that is returned by the destination operating system 20 is mapped onto an error code of the origin operating system in the best way possible. Depending on which operating system provides a finer fanning of the error code, either one composite code of the origin operating system is generated for several codes of the destination system 20, or only a few of the error codes of the origin operating system are used, namely those which fit the best.

1.4 (Pointers, Addresses)

To convert pointer types, a mapping between the address spaces of the origin system and the destination system must be selected and applied in the delivery of parameters and results.

Figure 2:
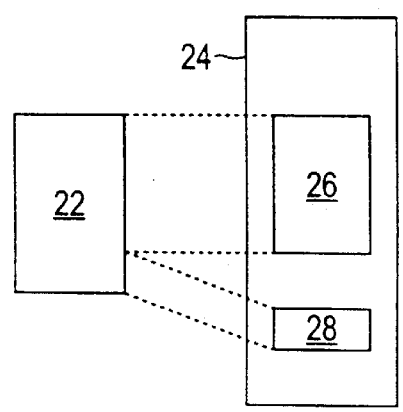
FIG. 2 is a schematic representation of the embedding of an address space of an origin system in an address space of a destination system.

FIG. 2 shows an example in which an address space 22 (address area that can be used by application programs) of the origin system is smaller than an address space 24 of the destination system 10. The address space 22 is embedded in the address space 24 in this case, as indicated by the broken lines in FIG. 2. But care must be taken in the embedding process that system calls 20 for the destination operating system 14 deliver as results only pointer values which point to the area of the embedded origin address space 22 within the address space 24. For instance, it may be necessary to map the address area that is reserved on the origin system for shared library code onto an area that is also reserved for this in the destination system 10. The original address space 22 may have to be embedded in several separate areas 26,28 in the address space 24 of the destination system 10, as warranted.

If, on the other hand, the destination address space 24 is smaller than the original address space 22, and only those application programs 12 which do not exploit the full origin address space 22 are able to run on the destination system 10. In this case, an unambiguous mapping into the destination address space 24 can be defined only for part of the origin addresses. If, in the program sequence, pointer values or addresses lie outside the defined part of the origin address space and are to be delivered in a system call, the respectively relevant emulation routine 16 triggers a corresponding exception.

In many cases, an element of a pointer type points to a data structure that is not further specified, which need not be interpreted further. In the notation of the programming language C, this is expressed by the type statement "*void". When this is not the case, in addition to the described conversion of the pointer value, the referenced data structure must also be converted. Examples of this are dealt with more closely below in sections 2.1, 2.2, 2.3, 2.4 and 2.5. With respect to the additional special case of a pointer to a function, see section 4.

2. Composite Types 2.1 Product Data Types (tuple)

The structure of product data types which are delivered as parameter or result of a system call is specified by the origin operating system and is thus known. A product data type is called "struct" or "structure" in C. The elements of a product data type are referred to here as tuples in order to prevent confusion with the concept of a data structure in the broader sense.

If the fields of a tuple contain only data types that do not require conversion, the emulation routine 16 need merely convert one pointer to the tuple in accordance with the method described in section 1.4 and deliver this.

If, on the other hand, the fields of a tuple need to be converted, then the relevant emulation routine 16 copies the complete tuple field by field in a system call of the application program 12 and delivers a pointer to the copy to the destination operating system 14. If the destination operating system 14 changes the copied tuple, the emulation routine 16 converts the changes back into the original tuple again. It can also be necessary to copy and convert the tuple when the layout (number, order and orientation of the fields) of the tuple in the origin system does not correspond to the conventions in the destination system 10.

Figure 3:
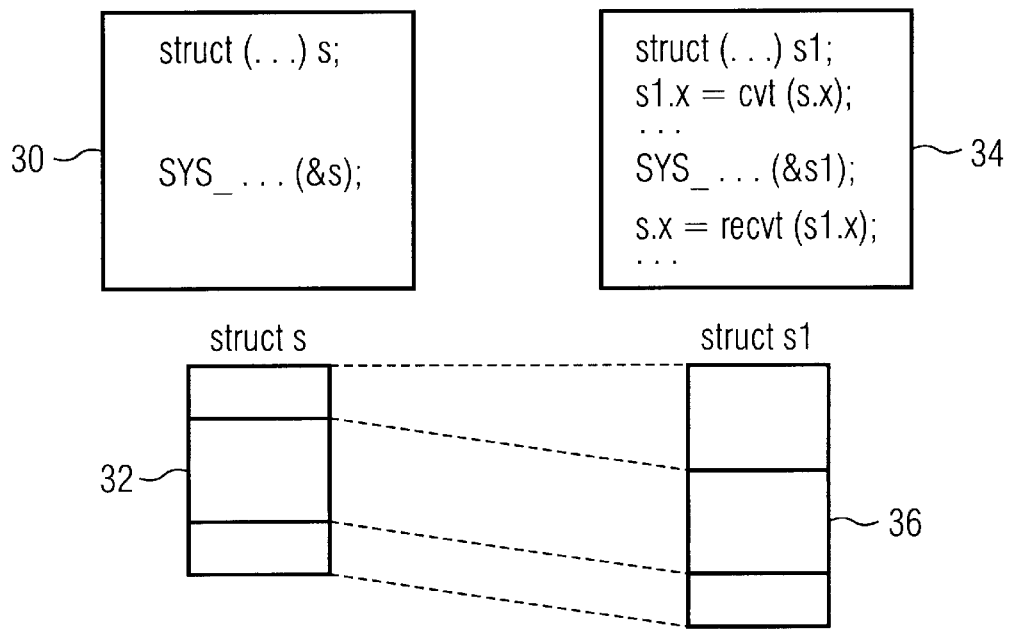
FIG. 3 is a schematic representation of the conversion of a tuple.

FIG. 3 shows an example of a section 30 of the application program 12, which is written in C, in which a tuple 32 is defined and a system call corresponding to the conventions of the origin system is performed. This call is processed by a section 34 of the emulation routine 16, as described above. The emulation routine 16 applies a converted tuple for this, calls the destination operating system 14, and transfers potential modifications back into the tuple 32.

2.2 Date and Time

Date and time types are mostly numerical values or tuples. The emulation routines 16 employ predetermined conversion rules in order to convert different formats and layouts into one another. If a two-digit year count in a data type is to be converted into a four-digit year count, heuristic methods must be applied.

In data types for stating times (e.g. UNIX type "hrtime_t") a different resolution or granularity must be taken into account. In particular, two time stamps which are different in the origin type must also be different in the destination type. If the resolution in the destination type is lower than in the origin type, the emulation routine 16 may delay the system call 20 as warranted in order to obtain a time stamp that is also new in the time resolution of the origin type.

2.3 Context

A context type refers to a tuple which holds the entire or partial processor state (register contents, instruction counter, and so on . . . ) at a specific time (for instance at an interrupt time).

If the processor architecture of the origin system is different from that of the destination system 10, the context tuples usually differ significantly. So that the application program 12 is able to run on the destination system without retranslation, either the origin processor is emulated on the destination processor, or the application program 12 is transformed dynamically or statically on the object code level.

In an emulation process, the emulator manages the emulated context of the origin processor. Each emulation routine 16 for a system call which is supposed to process a context and/or deliver it as result accesses this emulated context and returns it to the application program 12.

If the origin application is converted into a program that can run on the destination system 10 with the aid of a static or dynamic object code transformation, this transformation must likewise provide that the context can be obtained at potential interrupt bits in accordance with the givens of the origin processor. To this end, for example given an asynchronous interruption, the application program 12 can be continued in a single-step mode up to a next synchronization point at which the context of the origin processor is available in its entirety.

2.4 Arrays (Fields) and Character Strings

Arrays are treated analogously to the product data types described in section 2.1. Here, a few frequently occurring special cases must be taken into account. This applies particularly to character strings representing a special case of arrays.

In the conversion of a character string, the individual characters must be converted if they are coded differently in the origin system and the destination system (e.g. in an EBCDIC coding on one hand and an ASCII coding on the other hand). Even given the same character code, a conversion may be necessary if the storage representations of a character string in the origin system and in the destination system 10 differ. For example, in one system the convention can exist of ending a character string with a terminating character (as in C), while in the other system the length of the character string is indicated in a separate length field. In such cases, the relevant emulation routine 12 generates copies of the character strings in the respectively other representation.

Another special case in the processing of strings arises when the string contains a path and/or file name. This case is described below in section 5.

Finally, the case must still be considered where a system service (for instance the UNIX service "uname") delivers information about the system architecture and version of the destination system 10 in the form of a character string. Here, the application program 12 expects information about the origin system. This information is generated by the relevant emulation routine 16 corresponding to the emulated system version itself, without the corresponding service of the destination operating system 14 being taken into account. An analogous procedure is followed when the application program 12 expects such information as tuples.

2.5 Concatenated Data Structures

If data structures, particularly tuples or arrays, receive references to other data structures on their end, then these referenced data structures must also be converted, as warranted. The emulation routines 16 thus pass through the concatenated data structure and execute the required copying and conversion processes (deep copy). The conversion is ended either when entire data structure has been passed through or when it is ascertained that there are no data requiring conversion located in the still unprocessed sections of the data structure.

2.6 Reserved Fields in Data Structures

A parameter or result type can be a data structure that contains fields that are interpreted by the application program 12 as well as fields that are reserved for the system (partially abstract data type). In this case, the reserved fields are treated like abstract data types, which are described below in section 3. The interpretable fields are converted like normal data structures.

3. Abstract Data Types

The result of a system call 20 can be a value (handle, index) which serves for access to system-internal data structures but which cannot and may not be interpreted further. The application program 12 can only store the obtained value as a reference value in order later to deliver it to another system call as a parameter. From the viewpoint of the application program 12, this is a matter of an abstract data type for which the system provides constructors and operations in the form of system calls. The abstract data type is identical to the type of reference values utilized. For example, for the abstract data type "file", file descriptors serve as reference values. These file descriptors are frequently declared in UNIX with the numerical data type "in".

In many cases, abstract data types (i.e. their reference values) on the origin system and the destination system 10 are so different that they occupy different amounts of memory. If the size and orientation of the origin type do not suffice for accepting all possible reference values of the destination type, the emulation routines 16 manage a conversion table which assigns a reference value of the origin type to each reference value of the destination type.

Figure 4:
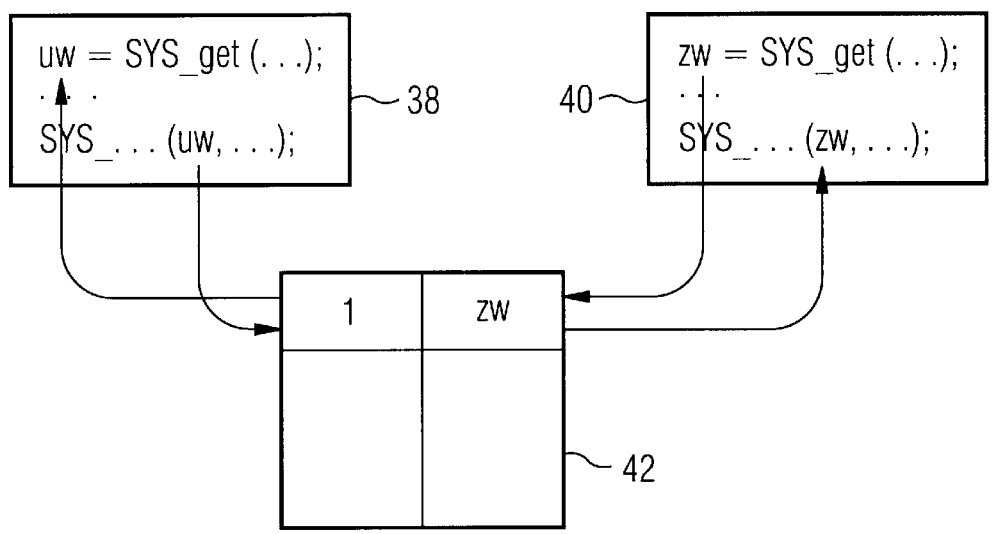
FIG. 4 is a schematic representation of the conversion of an abstract data type.

This method is exemplified in FIG. 4. A section 38 of the application program 12 contains two system calls, which are intercepted by the emulation routine 16. The emulation routine 16 on its part performs the system calls 20 that are indicated in a section 40. A conversion table 42 is assigned to the emulation routine 16. The conversion table 42 can be organized as a hash table, for instance. It produces the link between the reference values in accordance with the conventions of the destination operating system 14, or respectively, the application program 12.

If, for example, the application program 12 performs the call SYS_get indicated in the first line of the section 38, thereby obtaining an element uw of an abstract data type, the corresponding emulation routine 16 converts this call into the system call 20 of the destination operating system 14 that is indicated in the first line of section 40. Assume the system call 20 delivers the reference value zw as result. This value is sought in the conversion table 42 by the emulation routine 16. If zw is not found, the emulation routine 16 selects a new value uw from the value range of the origin type which is not yet contained in the conversion table 42. The value pair (uw,zw) is now entered into the conversion table 42, and the value uw of the origin type is returned to the application program 12. In most cases, the values of the origin type can be interpreted as numbers. New values can then be easily acquired by incrementing.

The application program 12 uses the obtained value uw as parameter in further system calls. In such a call, which is indicated in the last line of section 38, the emulation routine 16 again provides for the requisite conversion in that the value uw is looked up in the conversion table 42 and replaced by the value zw. The emulation routine 16 then forwards the system call with the reference value zw to the destination operating system 14, as illustrated in the last line of section 40.

4. Delivery of Functions (Function Addresses)

In some cases, functions (for instance error processing routines) are delivered as parameter in a system call. This is the case with the UNIX system call "signal", for example, in which the delivered function serves as interrupt handler. To deliver a function its entry address (function address) is delivered.

The function call conventions of the original system usually do not match those of the destination system 10, and so a direct call of an original function by the destination operating system 14 is not possible. Therefore, in preferred exemplifying embodiments of the invention, one (or both) of the following methods for handling function addresses as parameters is provided.

4.1 Dynamic Generation of Adapter Functions

Figure 5:
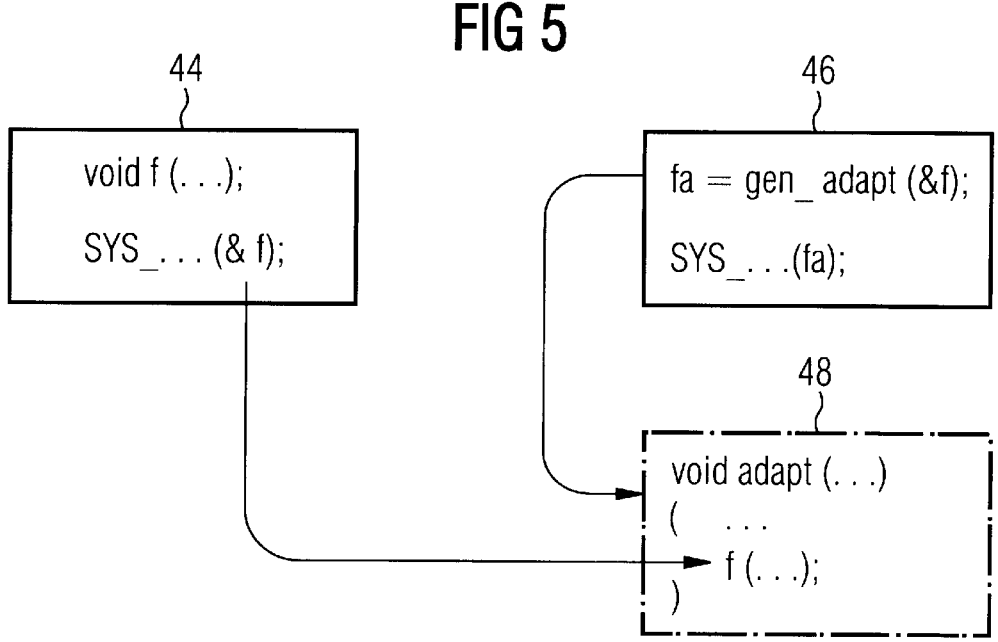
FIG. 5 is a schematic representation of the conversion of a functional parameter with dynamic generation of an adapter function.

This variant is illustrated in FIG. 5. In a section 44 of the application program 12, a function f is declared and delivered as parameter of a system call. The corresponding emulation routine 16, a section 46 of which is represented in FIG. 5, dynamically generates the code for an adapter function 48, which can be called in accordance with the conventions of the destination system 10 (first line of section 46). The address of this adapter function 48 is then delivered to the destination operating system 14 by the emulation routine 16 instead of the original function address (last line of section 46).

The adapter function 48 is designed to convert potential parameters in accordance with the method laid out here and ultimately to call the original function f with the converted parameters.

In preferred exemplifying embodiments, the emulation routines 16 keep an account of the original function addresses for which adapter functions have already been generated. This prevents the generating of several adapter functions for one and the same function address.

4.2 Universal Adapter Functions

Figure 6:
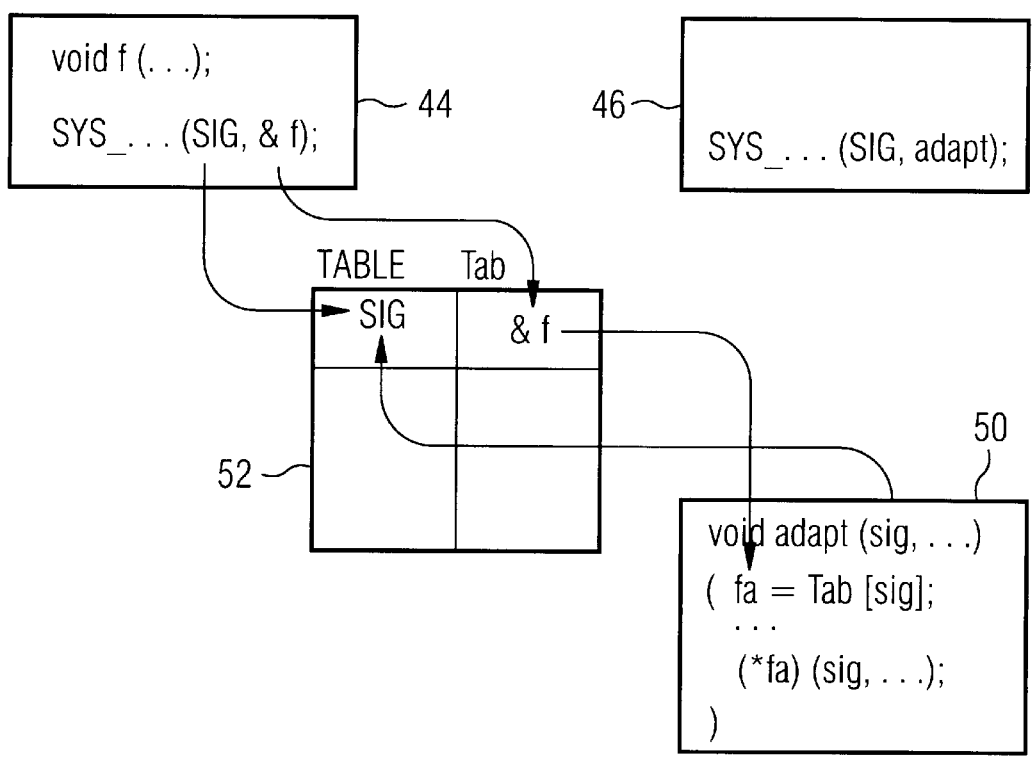
FIG. 6 is a schematic representation of the conversion of a functional parameter with the aid of a universal adapter function.

In this variant, which is illustrated in FIG. 6, at least one universal adapter function 50 is provided, which can be called in accordance with the conventions of the destination operating system 14 and which serves as "springboard" for several functions that are delivered by the application program 12. A call table 52 serves for registering and allocating said functions.

When, in a system call of the application program 12, a function address is delivered as parameter (last line of section 44), the emulation routine 16 that intercepts this call 18 enters the function address into the call table 52 under the corresponding index. The address of the universal adapter function 50 is delivered to the destination operating system 14 by the emulation routine 16 as function address (system call in section 46). When the destination operating system 14 later calls the universal adapter function 50, the latter converts potential parameters, unloads the original function address from the call table 52, and calls this function.

The method just described is suited particularly to the UNIX system call "signal" or comparable system calls in other operating systems, since the call table 52 can then be organized easily as an array with the signal as index, as is shown in FIG. 6.

5. Files

In certain circumstances, contents of files have different formats on the origin system and the destination system 10 (e.g. with respect to the representation of binary coded numeric values or with respect to the character code used). In the exemplifying embodiments described here, application-specific files are not converted.

By contrast, system files (files whose structure is determined by the operating system) are made available both in a version for the application program 12 and in a synchronous version for the destination operating system 14. System files (for instance the file "terminfo" in UNIX) are recognized by the file and/or path names they have, which are prescribed by the operating system. This name serves as the reference value which makes it possible to access the actual file.

In this exemplifying embodiment, copies of the system files of the origin system are present on the destination system 10. These are usually not available on the destination system 10 under the same path as on the origin system, since the corresponding destination-system-specific files are already located there.

In the conversion of a system call of the application program 12 that calls a file (for instance the call "open" in UNIX), the relevant emulation routine 16 checks with the aid of the path name whether the matter at hand is an access of a system file. If so, the indicated path is replaced by the path name, which is known to the emulation routine 16, to the corresponding copy of the file from the original system.

The files that are transferred from the original system and the system files of the destination system 10 can be synchronized in different ways. For instance, a demon can be provided, which periodically matches the files in pairs. Furthermore, the emulation routines 16 can be designed to update both versions with each writing access to a system file. When a system file is generated from a source text with the aid of a special compiler (as the UNIX system file "terminfo" with the compiler "tic"), then in addition to the compiler of the destination system 14 a copy of the corresponding compiler from the original system can be started, in order to generate both variants of the system file. Finally, it is also possible to employ a modified compiler that always generates both versions.

In alternative embodiments of the invention, not all of the conversion methods described above are implemented. At the present time, the processing of abstract data types, pointers to functions and system files is considered particularly important.

Although various minor changes and modifications might be proposed by those skilled in the art, it will be understood that our wish is to include within the claims of the patent warranted hereon all such changes and modifications as reasonably come within our contribution to the art.

What is claimed is:

1. A method for converting a system call for an origin operating system into a system call for a destination operating system, comprising the steps of:

providing at least one reference structure which comprises at least one reference value with aid of which at least one referenced element of the reference structure can be accessed;

calling an emulation routine;

with the emulation routine, converting said reference structure by converting at least said reference value; and with the emulation routine, performing the system call for the destination operating system, at least the reference value of the system call for the origin operating system being saved for use in further subsequent origin system calls to be converted for the destination operating system.

2. The method as claimed in claim 1 wherein the emulation routine first executes conversion functions.

3. The method as claimed in claim 1 wherein the at least one referenced element is converted in the step of converting the reference structure.

4. The method as claimed in claim 1 wherein for converting the reference value, the emulation routine accesses a conversion table in which a respective reference value in the system call for the origin operating system and a reference value in the system call for the destination operating system are assigned to one another.

5. The method as claimed in claim 4 wherein it is checked whether a reference value that has been obtained as a result of a system call for the destination operating system is contained in the conversion table, and that if not, a new reference value that has been formed in accordance with conventions of the origin operating system is assigned to this reference value in the conversion table.

6. The method as claimed in claim 1 wherein the referenced element is a function, and which in the conversion of the emulation routine generates a new reference value that references an adapter function.

7. The method as claimed in claim 6 wherein the adapter function is formed in the conversion dependent on the function referenced by the original reference value.

8. The method as claimed in claim 6 wherein the adapter function comprises a universal adapter function designed to access a call table in order to determine the function that is referenced by the original reference value.

9. The method as claimed in claim 1 wherein the referenced element is a first system file in accordance with conventions of either the origin operating system or the destination operating system, and that the reference value is converted into a second system file which is synchronized with the first system file but is structured in accordance with conventions of the respective other operating system.

10. The method as claimed in claim 1 wherein the referenced element is an element of at least one of a product data type and a concatenated data structure, and that, in the conversion process, the referenced element is copied and converted by at least one of field by field and element by element.

11. The method as claimed in claim 1 the referenced element has a significance that can be interpreted by the emulation routine, and that this significance is preserved in the conversion of the referenced element.

12. The method as claimed in claim 11 wherein the referenced element is an element of at least one of a date type, of a time type, of a context type, of a character string type, and of a product type having at least one of these types as a component.

* * * * *